United States Patent [19]
Henkel et al.

[11] 3,974,716
[45] Aug. 17, 1976

[54] METHOD AND ARRANGEMENT FOR EQUALIZING THE SPEEDS OF A PLURALITY OF ASYNCHRONOUS MOTORS JOINTLY DRIVING A SINGLE MACHINE, PARTICULARLY A MINING MACHINE

[75] Inventors: Egon Henkel, Essen; Heinrich Wildförster, Gelsenkirchen-Buer, both of Germany

[73] Assignee: Bergwerksverband GmbH, Essen, Germany

[22] Filed: Jan. 21, 1974

[21] Appl. No.: 435,382

[30] Foreign Application Priority Data
Jan. 24, 1973 Germany............................ 2303250

[52] U.S. Cl. .................................................. 74/661
[51] Int. Cl.² ........................................... F16H 37/06
[58] Field of Search ............. 74/661, 665 L, 665 Q, 74/730, 645, 720, 665 P; 60/426, 698, 716; 318/99

[56] References Cited
UNITED STATES PATENTS
3,576,106   4/1971   Nowicki............................ 74/661 X

*Primary Examiner*—Samuel Scott
*Assistant Examiner*—Frank H. McKenzie, Jr.
*Attorney, Agent, or Firm*—Michael J. Striker

[57] ABSTRACT

The driven machine, for example a mining machine having a long drive chain driven by a plurality of sprocket wheels, has a plurality of input shafts, for example the shafts of the plurality of sprocket wheels. A plurality of asynchronous drive motors is provided, each for the driving of a respective one of the input shafts of the machine. A plurality of hydrostatic speed converters is provided, each connected in force-transmitting manner to a respective one of the asynchronous drive motors. The pressure and flow of all the hydrostatic speed converters are equalized, in order to equalize the speeds and loads of all of the asynchronous drive motors.

15 Claims, 6 Drawing Figures

METHOD AND ARRANGEMENT FOR EQUALIZING THE SPEEDS OF A PLURALITY OF ASYNCHRONOUS MOTORS JOINTLY DRIVING A SINGLE MACHINE, PARTICULARLY A MINING MACHINE

The invention relates to method for the equalization of the speeds of a plurality of asynchronous motors, which are operative for driving, via a plurality of respective drive shafts turning at different respective speeds, a single driven machine, especially a mining machine, and furthermore relates to an arrangement for performing the method.

In mining, use is often made of machines, such as various conveyors, having very long endless chain drives, driven by a plurality of sprocket wheels, with each sprocket wheel being driven by a separate respective drive unit, usually an electromechanical drive unit such as an electric motor, and usually an asynchronous motor, with intermediate mechanical transmissions and/or gear-shifting mechanisms. Because of differences in the lengths of the chain portions driven by the different drive units, the respective asynchronous motors and accordingly the respective sprocket wheels may turn at different speeds, resulting in an unequal distribution of load among the plurality of drive units. When large operating loads are involved, this can result in overloading of one of the usually two motors driving the endless chain. As a result, the conventionally provided overload arrangement will bring the drive units to an undesired stop, in order to prevent damage to the overloaded motor or motors. Unless some means is provided for equalizing the load distribution, overloading of individual ones of the drive motors can be avoided only by extreme worst-case design of the motors.

It is known, with asynchronous motors of the type employing slip rings, to use an electrical method of load equalization involving so-called equalization shafts. This method cannot ordinarily be employed in coal mines, for example, because of the danger of explosion, unless special explosion-preventing arrangements are provided. However, such additional safety equipment is expensive, and often of very considerable weight and size.

Also known are mechanical arrangements operative for equalizing the load on the plurality of drive motors of machines of the type in question. These arrangements make use, for example, of differential gearing. However, the known arrangements are in general not suitable for the conditions in underground mines, where the air is likely to be dust-filled, where the available space is very limited, and where transportation of equipment is difficult. Also, these known arrangements are in general complicated and expensive.

It is the general object of the invention to provide a method and arrangement for the equalization of the loads applied to the plurality of drive units of a single multi-drive machine, not characterized by the abovedescribed disadvantages.

The solution constituted by the present invention is based upon the fact that when a predetermined driving voltage is applied to identical asynchronous motors, fixed relationships exist between the electrical power input, on the one hand, and the load torque and speed, on the other hand. Accordingly, with two asynchronous motors having the same speed-torque curves, the motor performance variables will have the same values, if either the speed or the torque of both motors are maintained equal to each other.

The invention proposes as a first solution to the problem a first method for the equalization of the speeds of the plurality of drive motors such that the asynchronous motor of each drive unit is connected in force-transmitting manner to a respective one of the input shafts of the machine via a respective one of a plurality of hydrostatic speed converters, with the pressure and flow of all the hydrostatic speed converters being equalized.

The invention proposes as a second solution to the problem a second method whereby use is made of a plurality of differential gearing units, each comprised of an input shaft connected to the output shaft of a respective one of the drive motors, and each comprised of a first output shaft connected to a respective one of the plurality of input shafts of the driven machine, and each further comprised of a second output shaft connected in force-transmitting manner to a respective one of a plurality of hydrostatic speed converters, with the pressure and flow of all the hydrostatic speed converters being equalized.

With both approaches of the invention, the speeds of the asynchronous motors are equalized if the speeds of the plurality of input shafts of the driven machine have different values. Corresponding to the graphical characteristics of the asynchronous motor, this means that all the motors will have the same power input, so that when used to drive a machine having a long endless drive chain driven by a plurality of sprocket wheels, the aforedescribed overloading of individual ones of the motors will be avoided. With the inventive approach, it is accordingly possible to reduce the total power requirement for the motor installation or else, if the total power requirment is not reduced, to achieve an increase in the efficiency of operation of the driven machine.

To perform the first-mentioned method, it is proposed according to the invention to make use of a driven machine of a first type characterized by as a fact that connected between the asynchronous motor of each drive unit and the associated input shaft of the multiple-input-shaft machine, is a respective hydrostatic speed converter capable of performing alternatively as an hydraulic motor or a pump. The hydrostatic speed converter has a housing unit connected in force-transmitting manner with the output shaft of the respective asynchronous drive motor, and has a rotor unit connected in force-transmitting manner with the respective input shaft of the driven machine, or vice versa, with all the hydrostatic speed converters being connected together by hydraulic conduits to effect an equalization of pressure and flow. For example, each hydrostatic speed converter may have a stationary distributor unit comprised of suction and pressure conduits, with additional conduits being provided connecting together the suction and pressure conduits of the plurality of hydrostatic speed converters.

To perform the second method, it is proposed according to the invention to employ a machine of a second type, characterized by the fact that between the acynchronous motor of each drive unit and the associated input shaft of the driven machine, there is connected a respective one of a plurality of differential gearing arrangements, one output shaft of which is connected to the input shaft of one of the chain-driving sprocket wheels of the machine, with the other output shaft of the differential gearing arrangement being connected to the rotor of a hydrostatic speed converter provided with a stationary housing, the hydrostatic speed converter being capable of performing either as a motor or as a pump, with the pressure and flow of all the hydrostatic speed converters being equalized.

The intermediate connection of a plurality of interconnected hydrostatic speed converters between a plurality of drive motors and a plurality of driven shafts, or the intermediate connection of a plurality of differential gearing arrangements between a plurality of drive motors and a plurality of driven shafts in conjunction with a plurality of hydrostatic speed converters connected to the differential gearing arrangements, is characterized by the fact that if the speeds of the driven inpur shafts of the machine assume different values, the speeds of the plurality of drive motors will all have the same value, in consequence of a marked change in the effective transmission ratio. Therefore, in accordance with the speed-torque curves of the asynchronous motors, the load torques of all the motors will have the same value. This equalization of load torque results from the interconnection by means of hydraulic conduits of all of the hydrostatic speed converters. The hydrostatic speed converters operate, in accordance with the loads to which they are subjected, either as hydraulic motors or pumps.

Thus, with machines of the first type mentioned above, both the rotor unit and also the housing unit of the hydrostatic speed converter will turn, but the speeds of the rotor and housing units differing by the slip amount, while the distributor unit of the hydrostatic speed converter is stationary. But with machines of the second type mentioned above, the housing unit is stationary.

In each hydrostatic speed converter the load corresponding to the torque produces a certain pressure level, so that in the event of differing loads on the hydrostatic speed converters respective different pressure levels will be established. However, provision of the equalizing conduits results in an equalization of the pressures in all the hydrostatic speed converters, resulting necessarily in a corresponding equalization of the load torques of all the respective drive motors.

This type of load equalization is particularly suited for the operation of asynchronous motors, since with such motors small speed changes can result in lare changes of load torques. By equalizing the speeds of the motors, differences in the loading of the plurality of motors are avoided, with all the motors being equally loaded.

For example, with a machine of the first type mentioned above, the hydrostatic speed converter associated with a motor being subjected initially to a higher load than the other motors will act as a pump, so that the slip speed of the speed converter will increase the transmission ratio of the respective driven unit. The speed converters of the other less-loaded motor will, in contrast thereto, operate at this time as an hydraulic motor, and will reduce the transmission ratio of the associated drive unit, with the same but oppositely directed slip speed.

The invention makes it possible, with machines driven by a plurality of drive motors, particularly asynchronous motors, to achieve a uniform load distribution also in the case of motors of differing speed-load characteristics or smaller transmission ratio deviations in the transmission gearing. The incorporation of a hydrostatic speed converter between the driven machine and the motors results in a damping of undesirable sudden changes in loading which is particularly important in the case of mining equipment which otherwise often exhibits such sudden load changes. This results in a considerable increase in the useful life of the equipment.

Since hydrostatic speed converters are speed-independent beneath a certain maximum permissible speed, they can advantageously be employed together with the pole-reversing asynchronous motors lately being used in underground mining machinery.

With a machine of the first type, if transmission gearing units are connected between the asynchronous motors and the input shafts of the driven machine, the hydrostatic speed converters can be provided between the drive motors and the transmission gearing, or between the transmission gearing and the input shafts of the driven machine. As a further possibility, in certain cases it may be advantageous to incorporate the hydrostatic speed converter intermediate two gearing stages of a transmission gearing arrangement.

Because of the dependence of the driving torque to be transmitted upon the pressure level, it is easy to provide the machines of both the first and second types with a safety arrangement for preventing damage resulting from overloading, in the form of a pressure-limiting valve in the hydraulic circuitry. The pressure limit in the system can be set to any desired value to provide a delay-free protection against overloading, so that, for example, the conventional shear-pin safety arrangements can be dispensed with.

According to a further concept of the invention, machines of both the first and second types can be provided with short-circuiting conduits connecting together the pressure and suction conduits of the hydrostatic speed converters, to prevent pressure build-up in the hydrostatic speed converters, so that the short-circuited hydrostatic speed converters will transmit no torque.

By incorporating a pressurized valve in the short-circuiting conduit, there can be effected a gradual pressure build-up as an aid to starting, with the help of which the starting operation of the machines of the first and second types mentioned above can be controlled. Also, in this way it is possible to achieve an automatic disengagement of the drive, so that coasting to a stop of the driven machine will be significantly reduced. With plow or blade installations this can for example result in a reduced stall length requirement. Furthermore, as a result of a corresponding soft start and braking, and as a result of reduced speeds, repair work can be performed more safely than before.

By incorporating a restrictor element, for example a pressurizing valve, in the pressure or suction conduits of the hydrostatic converters, it is possible to achieve a definite adjustable prestressing of the drive chain of the driven machine.

Since the loading of the driven machine is proportional to the system pressure, it is possible by measuring the pressure level using a measuring instrument, and by processing the pressure-indicating signal, to establish a load-dependent follow-up control for the control of the same or other driven machines, or for use in the control of other machine operations.

According to a further concept of the invention, each drive unit of a machine of the first type can be constructed as a reversible drive unit and in such a manner as to eliminate the need for reversing the rotation of the drive motor of the drive unit. This can be accomplished by incorporating in each drive unit two parallel arranged oppositely acting transmission gearings each incorporating a hydrostatic speed converter, connected between the asynchronous drive motor and the respective sprocket wheel of the chain of the driven machine. The rotational direction of the driven sprocket wheel will be determined by which of the two associated hydrostatic speed converters is connected to the suction and pressure conduits of the plurality of drive units. With this type of drive unit, a simple reversible coupling is provided for the frequently desired reversal of drive direction, but with the drive motor itself always turning in the same direction irrespective of the direction of rotation of the respective driven sprocket wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Figure 1:
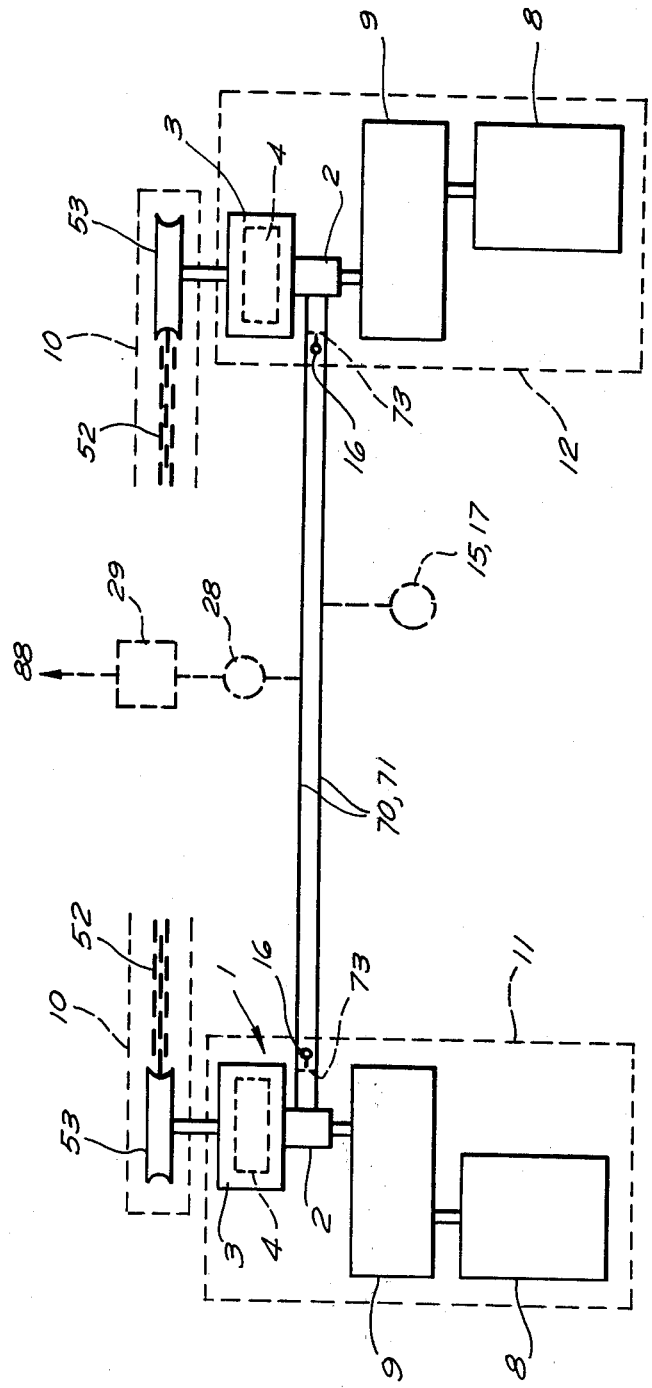
FIG. 1 is a schematic illustration of a machine driven jointly by a plurality of motor drives, the speeds of which are equalized.

FIG. 1 is a schematic depiction of a machinery installation according to the invention of a first type, with a working machine 10, which in the illustration is a chain-driven mining machine. The working machine 10 in the illustrated example is driven by two drive units 11, 12 acting jointly. Associated with each drive unit 11, 12 is hydrostatic speed converter 1 comprised of a housing 3, a rotor unit 4 and a distributor unit 2, the hydrostatic speed converter 1 being connected intermediate the gearing 9 and the chain-driving sprocket wheel 53, in order to effect an equalization of the speeds of the two chain-driving sprocket wheels 53 of the two drive units 11, 12.

Depending upon the circumstances of a particular application, the hydrostatic speed convert 1 can equally well be connected intermediate the drive motor 8 and the gearing 9, or else between two separate gearing stages.

The two drive units 11, 12 are located at a distance from each other, but are mechanically connected together by means of the endless chain 52, and hydrostatically connected by means of connecting conduits 70, 71. Inside the chain 52 different chain lengths appear, and as a result the two sprocket wheels 53 turn at different speeds, resulting in different loading of the two motors 8, unless in the manner proposed herein a speed equalization is effected by means of hydrostatic speed converter 1, in which pressure and flow compensation is effected via the connecting conduits 70, 71 so that the two motors 8 turn with the same speed and are equally loaded.

Figure 2:
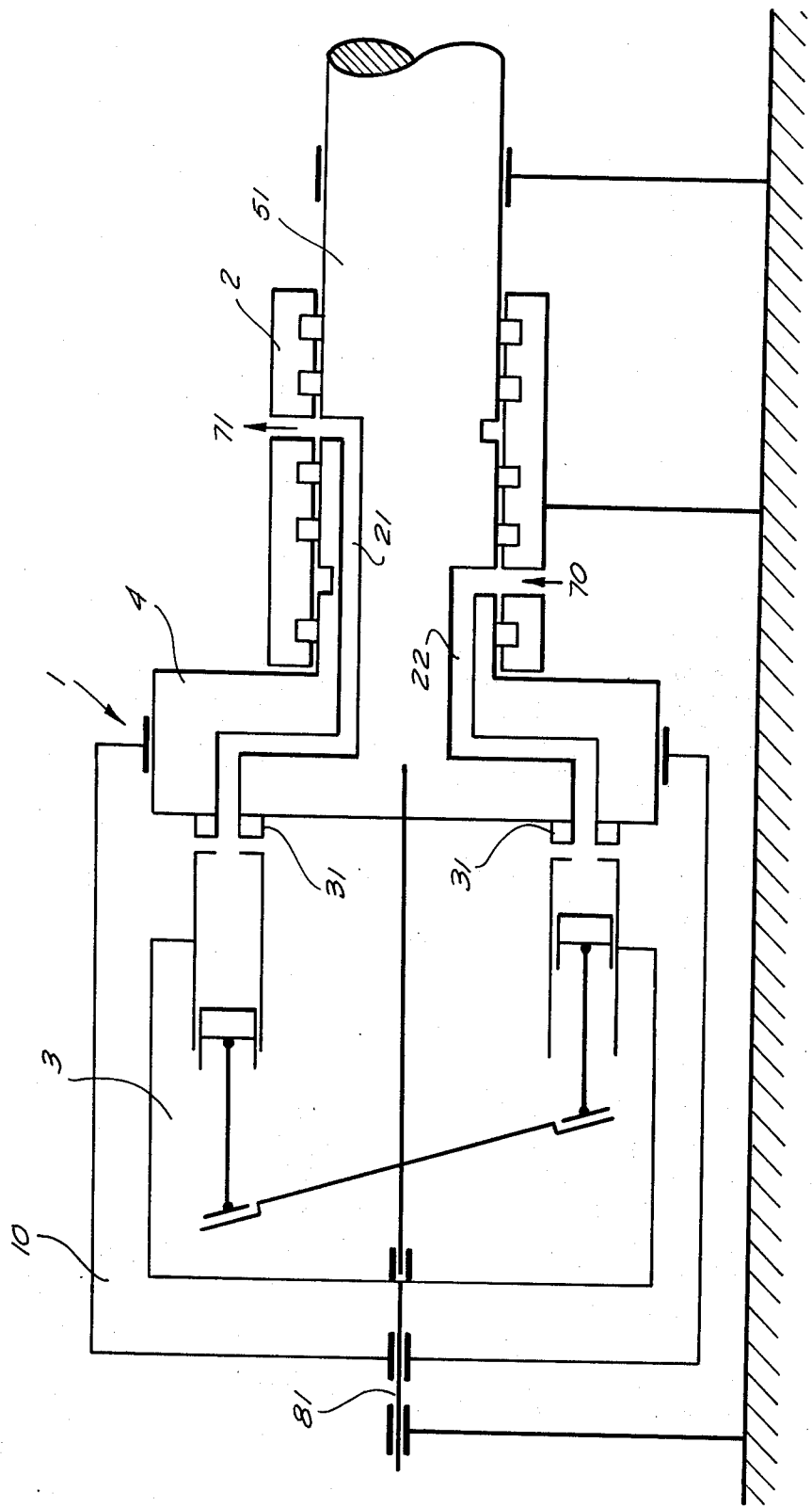
FIG. 2 depicts a hydrostatic speed converter for use in the arrangement shown in FIG. 1.

FIG. 2 depicts a hydrostatic speed converter 1 suitable for a machine of the type depicted in FIG. 1. The hydrostatic speed converter 1 is comprised of a housing 3 and a rotor unit 4, the housing 3 and the rotor unit 4 being rotatable on a stationary distributor unit 2. The housing 3 of the hydrostatic speed converter 1 is directly and rigidly connected to the drive shaft 81 of the drive motor 8, the drive motor 8 not being shown in FIG. 2, and furthermore to the hydraulic cylinders. The rotor unit 4 is rigidly connected to the drive shaft 51 of the machine 10, which likewise is not explicitly depicted in FIG. 2, and furthermore cooperates with the hydraulic pistons. Housing 3 and rotor unit 4 are in conventional manner rotatable in opposite directions, and also rotatable in the same direction. The stationary distributor unit 2 is in the illustrated embodiment arranged at the side of the axial piston machine, and surrounds the drive shaft 51. In the distributor unit 2 there are arranged a pressure conduit 21 and a suction conduit 22. A connection 31 leads to the housing unit 3.

Connected to the pressure conduit 21 is a pressure line 71, and connected to the suction conduit 22 is a suction line 70, each of these lines 70, 71 leading to the hydrostatic speed converter 1 of the respective other one of the two drive units 11, 12. However, the lines 70, 71 can also be short-circuited (conduits 73 in FIG. 1) and provided with valves 15, 16, throttles 17 or other fittings or equipment, for example a measuring unit 28.

Figure 3:
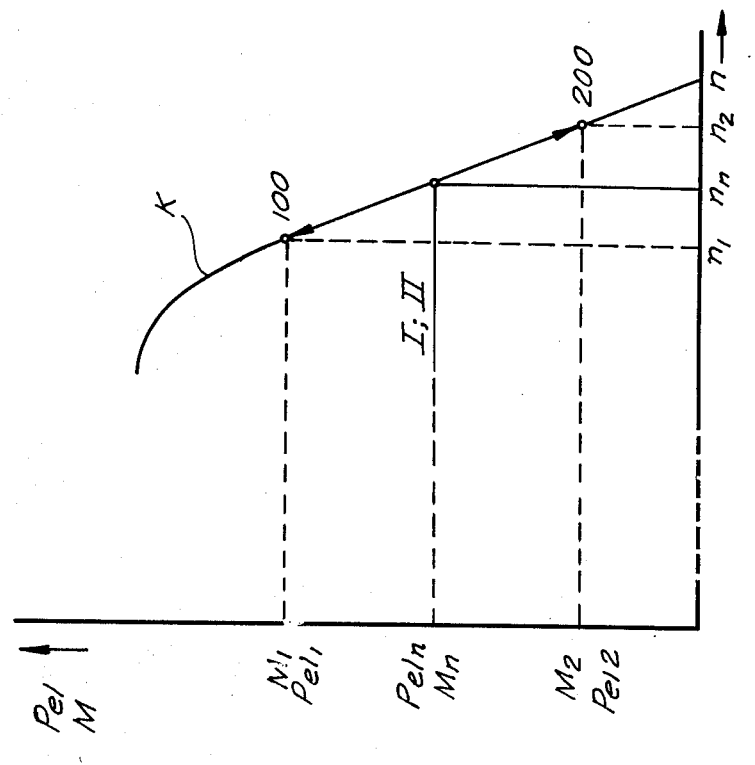
FIG. 3 depicts the speed-torque curve of a particular motor.

The two asynchronous drive motors 8 are of identical construction. When the same driving voltage is applied to the two motors 8, the power input $P_{e1}$ and the torque M of the drive shafts 81 are related to the speed $n$ as shown by curve K in FIG. 3.

Figure 4:
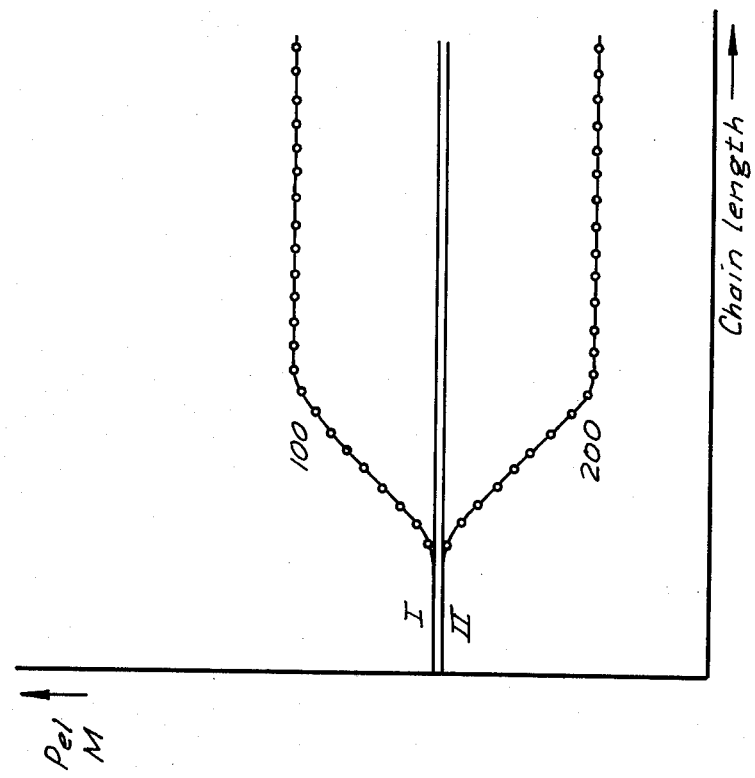
FIG. 4 depicts the torque-chain length curve for the machine shown in FIG. 1.

If two such asynchronous drive motors 8 are used to drive the two sprocket wheels 53 in FIG. 1, it may happen that each sprocket wheel 53 will in effect be driving a different length of chain, and as a result the speeds of the two drive motors 8 will ordinarily be different. If the two motors turn at respective speeds $n_1$ and $n_2$, the respective power inputs $P_{e11}$, $P_{e12}$ and the respective output torques $M_1$ and $M_2$ will correspond to the points 100 and 200 on the curve K of FIG. 3. If it is assumed that the sum of the output torques remains substantially constant, the load on the two drive motors 8 will vary in dependence upon the length of the driven chain in the manner shown in FIG. 4.

When axial piston machines which constitute the speed converters 1 are connected intermediate the motors 8 and the respective driven sprocket wheels 53, the otherwise differeing speeds $n_1$, $n_2$ of the two motors 8 are equalized, with the speed of both motors 8 assuming approximately the median value $n_n$, and the energy input of both motors 8 assuming approximately the median value $P_{ein}$, and likewise the output torque of both motors 8 assuming approximately the median value $M_n$, corresponding to the horizontal solid line I;II in FIG. 2. Accordingly, overloading of one motor 8 as a result of underloading of the other will be avoided.

Figure 5:
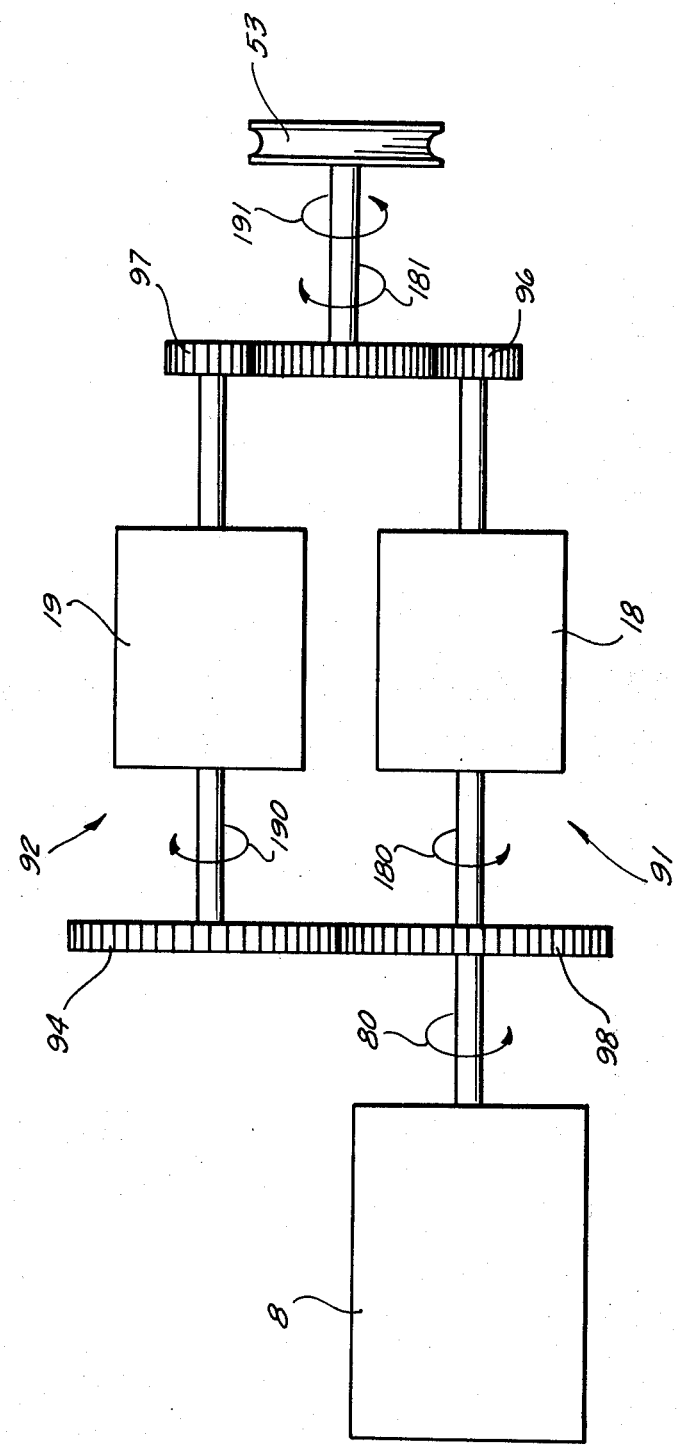
FIG. 5 is a schematic illustration of a reversible drive unit according to the invention for use in a driven machine of the first type discussed.

FIG. 5 depicts a machine provided with a drive chain driven by sprocket wheels from a drive motor 8 through the intermediary of two parallel arranged transmission arrangements 91, 92. Transmission 91 is comprised of a gear 98, a hydrostatic speed converter 18 and a gear 96. Transmission 92 is comprised of a gear 94, a hydrostatic speed converter 19 and a gear 97. With this arrangement, the rotational movement 80 of the motor 8 is converted by the transmission 91 via rotational movement 180 into rotational movement 181 of the chain-driving sprocket wheel 53 and is converted by the transmission 92 via rotational movement 190 into rotational movement 191 of the chain-driving sprocket wheel 53, which corresponds to the original direction 80 of rotational movement of the motor 8.

Whichever one of transmissions 91, 92 is not needed is put out of commission by taking out of the pressure suction hydraulic circuit (70, 71 in FIG. 1) the respective hydrostatic speed converter 18 or 19. The motor 8 of the machine 10 can accordingly always turn in the same direction (e.g., direction 80), irrespective of the direction in which the chain-driving sprocket wheel 53 should turn, e.g., 181 or 191, when one of the units 18 or 19 is operative, respectively. Such a reversible drive makes it possible to avoid the necessity of reversing the direction of rotation of the motor 8.

Figure 6:
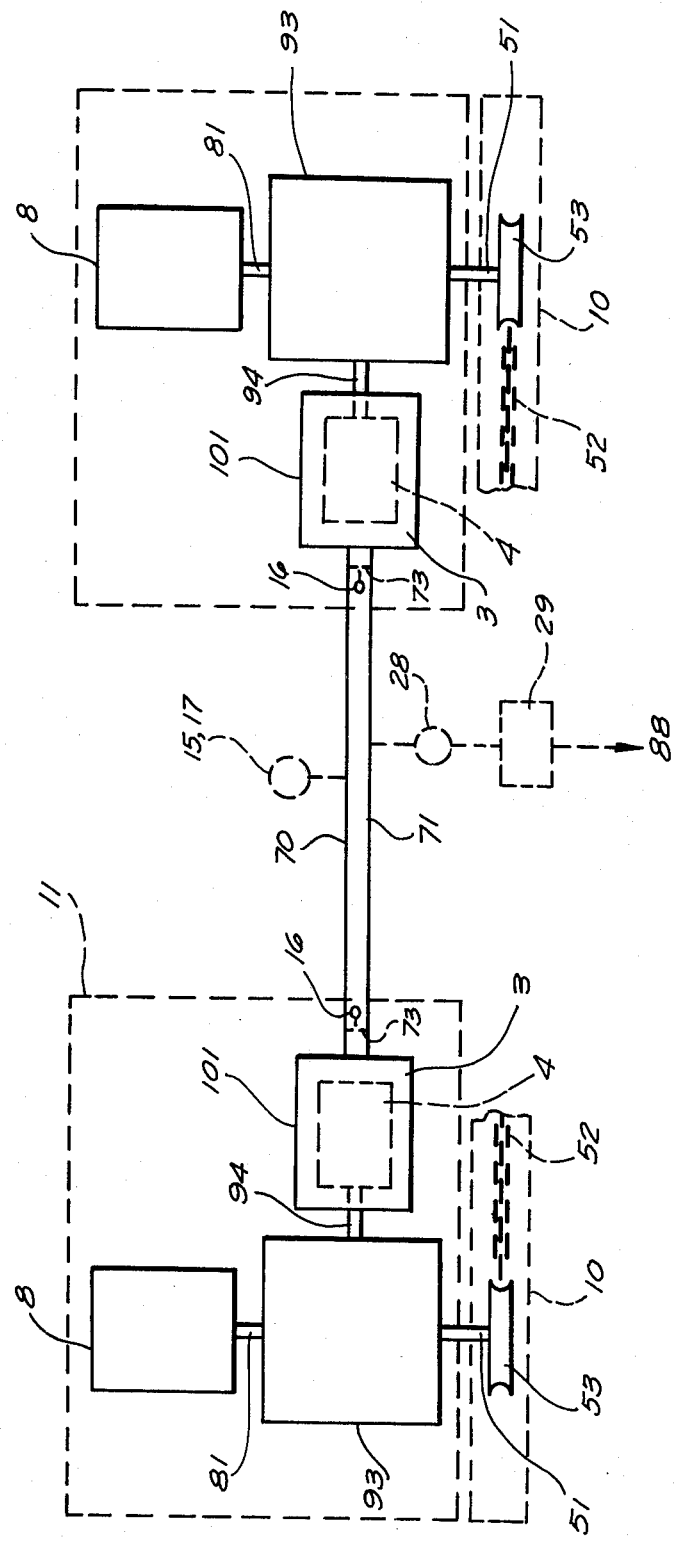
FIG. 6 is a schematic illustration of a second type of machine according to the invention driven jointly by a plurality of motor drives, the speeds of which are equalized.

FIG. 6 schematically depicts a work machine 10 of a second type according to the invention. The machine 10 is driven jointly by two drive units 11, 12. Each drive unit 11, 12 is comprised of a motor 8 having a motor output shaft 81 and connected thereto a differential gear arrangement 93 having one output shaft 51 connected to the chain-driving sprocket wheel 53 of the machine 10, and having another output shaft 94 connected to the rotor 4 of an axial piston machine 101. The axial piston machine is comprised of a stationary housing 3 and is capable of performing alternately as a motor or as a pump. The axial piston machines 101 of both drive units 11, 12 are mechanically connected together by means of drive chain 52, and are hydraulically connected together by means of connecting lines 70, 71 which serve to effect the pressure and flow equalization between the two hydrostatic speed converters. The association of the hydrostatic speed converter to the differential gear arrangement results in a load equalization between the drive motors 8 of the drive units 11, 12.

An overpressure valve 15 can be inserted into the hydraulic circuitry of the work machine of the first type and of the work machine of the second type discussed above, in order to establish an adjustable delay-free protection against overloading of the working machine 10, so that the otherwise conventional shear-pin safety arrangement can be dispensed with.

Short-circuiting of the pressure line 71 and of the suction line 70 by means of a short-circuiting conduit 73 can prevent a pressure build-up in the hydrostatic speed converters 1, 101, so that no torque will be transmitted by them.

By incorporating a pressurizing valve 16 in the short-circuiting conduit 73, the hydrostatic speed converters 1, 101 can be employed as a starting aid, by operation of which the starting of the working machine of either of the first or second types mentioned above can be controlled. Also, in this way, it is possible to achieve an automatic disengagement of the drive units 11 or 12, thereby reducing to an absolute minimum any tendency for the drive chain 52 to coast an appreciable distance to a stop. Finally, repairs can be more reliably performed as a result of the smooth starts and braking and as a result of operation at lowered speeds.

A throttling element, such as a pressurizing valve 17, can be incorporated in the pressure conduit 71 or in the suction conduit 70, in order to achieve a predetermined pressure level in the system. In this way, it is possible to establish a definite adjustable prestressing of the chain 52 of the working machine 10.

The loading of the working machine 10 is approximately proportional to the pressure in the system. By determining the pressure level using a measuring instrument 28, it is possible to make use of a load-dependent follow-up control 29, and to control the same or other working machines or other working operations. The control command signal is transmitting by means of a control conduit 88.

It will be understood that each of the elements described above, or two or more together, may also find a useful application in other types of constructions differing from the types described above.

While the invention has been illustrated and described as embodied in an arrangement for equalizing the speeds of a plurality of drive motors jointly driving a single driven machine, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A combination comprising a single machine having a plurality of input shafts; a plurality of asynchronous drive motors each having a respective drive shaft; a plurality of differential gear arrangements each having an input shaft connected in force-transmitting manner to the drive shaft of a respective one of said motors, and each having a first and a second output shaft; means connecting the first output shaft of each differential gear arrangement in force-transmitting manner to a respective one of said input shafts of said machine; a plurality of hydrostatic speed converters each comprised of a rotor unit connected in force-transmitting manner to the second output shaft of a respective one of said plurality of differential gear arrangements, and each further comprised of a stationary housing unit, each of said hydrostatic speed converters having inlet and outlet conduits, and each being capable of operating either as a hydraulic motor or as a pump, with the inlet and outlet conduits of all the hydrostatic speed converters being connected together to equalize the pressure and flow in all of the hydrostatic speed converters.

2. A combination as defined in claim 1, and further including an overpressure valve in one of said hydraulic conduits.

3. A combination as defined in claim 1, wherein each of said hydrostatic speed converters has a suction port and a pressure port, and further including at least one short-circuiting conduit connecting together the suction and pressure ports of at least one of said hydrostatic speed converters.

4. A combination as defined in claim 3, wherein said short-circuiting conduit comprises a pressurizing valve.

5. A combination as defined in claim 1, wherein at least one of said hydraulic conduits includes a pressurizing valve serving as a restrictor element.

6. A combination as defined in claim 4, and further including pressure-measuring means for measuring the pressure prevailing in at least one of said hydraulic conduits and operative for generating a pressure-indicating signal, and signal-processing means operative for receiving said pressure-indicating signal and processing the same for a load-dependent follow-up control.

7. A combination comprising a machine having a plurality of inputs; a plurality of asynchronous motors, one for each of said inputs and each having a rotary output element; a plurality of hydrostatic speed converters, one for each of said motors and each having a housing unit, a rotor unit in said housing unit, and stationary fluid distributor, one of said units receiving torque from the respective output element and the other of said units transmitting torque to the respective input, each of said speed converters being operable as a pump or motor; conduit means connecting the distributors of said speed converters with each other to effect pressure and flow equalization of fluid in all of said speed converters; and a plurality of transmission gearing arrangements each having an input shaft connected in force-transmitting manner to one of said units of a respective one of said hydrostatic speed converters and each having an output shaft connected in force-transmitting manner to a respective one of said inputs of said machine.

8. A combination comprising a machine having a plurality of inputs; a plurality of asynchronous motors, one for each of said inputs and each having a rotary element; a plurality of hydrostatic speed converters, one for each of said motors and each having a housing unit, a rotor unit in said housing unit, and a stationary fluid distributor, one of said units receiving torque from the respective output element and the other said units transmitting torque to the respective input, each of said speed converters being operable as a pump or motor, and each of said hydrostatic speed converters being connected intermediate two gearing stages of a respective one of a plurality of transmission gearing arrangements each of which transmits force from the output element of the respective asynchronous motor to the respective input of said machine; and conduit means connecting the distributors of said speed converters with each other to effect pressure and flow equalization of fluid in all of said speed converters.

9. A combination comprising a machine having a plurality of inputs; a plurality of asynchronous motors, one for each of said inputs and each having a rotary output element; a plurality of hydrostatic speed converters, one for each of said motors and each having a housing unit, a rotor unit in said housing unit, and a stationary fluid distributor, one of said units receiving torque from the respective output element and the other of said units transmitting torque to the respective input, each of said speed converters being operable as a pump or motor, and each of said hydrostatic speed converters having a suction port and a pressure port; at least one short-circuiting conduit connecting together the suction and pressure ports of at least one of said hydrostatic speed converters; and conduit means connecting the distributors of said speed converters with each other to effect pressure and flow equalization of fluid in all of said speed converters.

10. A combination as defined in claim 9, wherein said short-circuiting conduit comprises a pressurizing valve.

11. A combination comprising a machine having a plurality of inputs; a plurality of asynchronous motors, one for each of said inputs and each having a rotary output element; a plurality of hydrostatic speed converters, one for each of said motors and each having a housing unit, a rotor unit in said housing unit, and a stationary fluid distributor, one of said units receiving torque from the respective output element and the other of said units transmitting torque to the respective input, each of said speed converters being operable as a pump or motor; conduit means connecting the distributors of said speed converters with each other to effect pressure and flow equalization of fluid in all of said speed converters; and a plurality of transmission gearing arrangements, one for each of said motors, each of said gearing arrangements having an output shaft connected in force-transmitting manner to one of said units of the respective speed converter and an input shaft connected in force-transmitting manner to the output element of the respective motor.

12. A combination comprising a machine having a plurality of inputs; a plurality of asynchronous motors, one for each of said inputs and each having a rotray output element; a plurality of hydrostatic speed converters, one for each of said motors and each having a housing unit, a rotor unit in said housing unit, and a stationary fluid distributor, one of said units receiving torque from the respective output element and the other of said units transmitting torque to the respective input, each of said speed converters being operable as a pump or motor; and conduit means connecting the distributors of said speed converters, said conduit means comprising a plurality of hydraulic conduits and further including an overpressure valve in one of said hydraulic conduits.

13. A combination comprising a machine having a plurality of inputs; a plurality of asynchronous motors, one for each of said inputs and each having a rotary output element; a plurality of hydrostatic speed converters, one for each of said motors and each having a housing unit, a rotor unit in said housing unit, and a stationary fluid distributor, one of said units receiving torque from the respective output element and the other of said units transmitting torque to the respective input, each of said speed converters being operable as a pump or motor; and conduit means connecting the distributors of said speed converters with each other to effect pressure and flow equalization of fluid in all of said speed converters, said conduit means comprising a plurality of hydraulic conduits including a pressurizing valve serving as a restrictor element.

14. A combination comprising a machine having a plurality of inputs; a plurality of asynchronous motors, one for each of said inputs and each having a rotary output element; a plurality of hydrostatic speed converters, one for each of said motors and each having a housing unit, a rotor unit in said housing unit, and a stationary fluid distributor, one of said units receiving torque from the respective output element and the other of said units transmitting torque to the respective input, each of said speed converters being operable as a pump or motor; and conduit means connecting the distributors of said speed converters with each other to effect pressure and flow equalization of fluid in all of said speed converters, said conduit means comprising a plurality of hydraulic conduits and further comprising pressure-measuring means for measuring the pressure prevailing in at least one of said hydraulic conduits and operative for generating a pressure-indicating signal, and signal-processing means operative for receiving said pressure-indicating signal and processing the same for a load-dependent follow-up control.

15. A combination comprising a machine having a plurality of inputs; a plurality of asynchronous motors, one for each of said inputs and each having a rotary output element; a plurality of hydrostatic speed converters, one for each of said motors and each having a housing unit, a rotor unit in said housing unit, and a stationary fluid distributor, one of said units receiving torque from the respective output element and the other of said units transmitting torque to the respective input, each of said speed converters being operable as a pump or motor, and each of said speed converters constituting one component of a discrete drive unit having two hydrostatic speed converters arranged in two parallel oppositely acting transmission gear units each connected between the output element of the respective motor and the respective input of said machine; and conduit means connecting the distributors of said speed converters with each other to effect pressure and flow equalization of fluid in all of said speed converters.

* * * * *